Feb. 25, 1941.  L. D. MILLS ET AL  2,232,716
CYANIDATION METHOD AND APPARATUS
Filed July 12, 1937
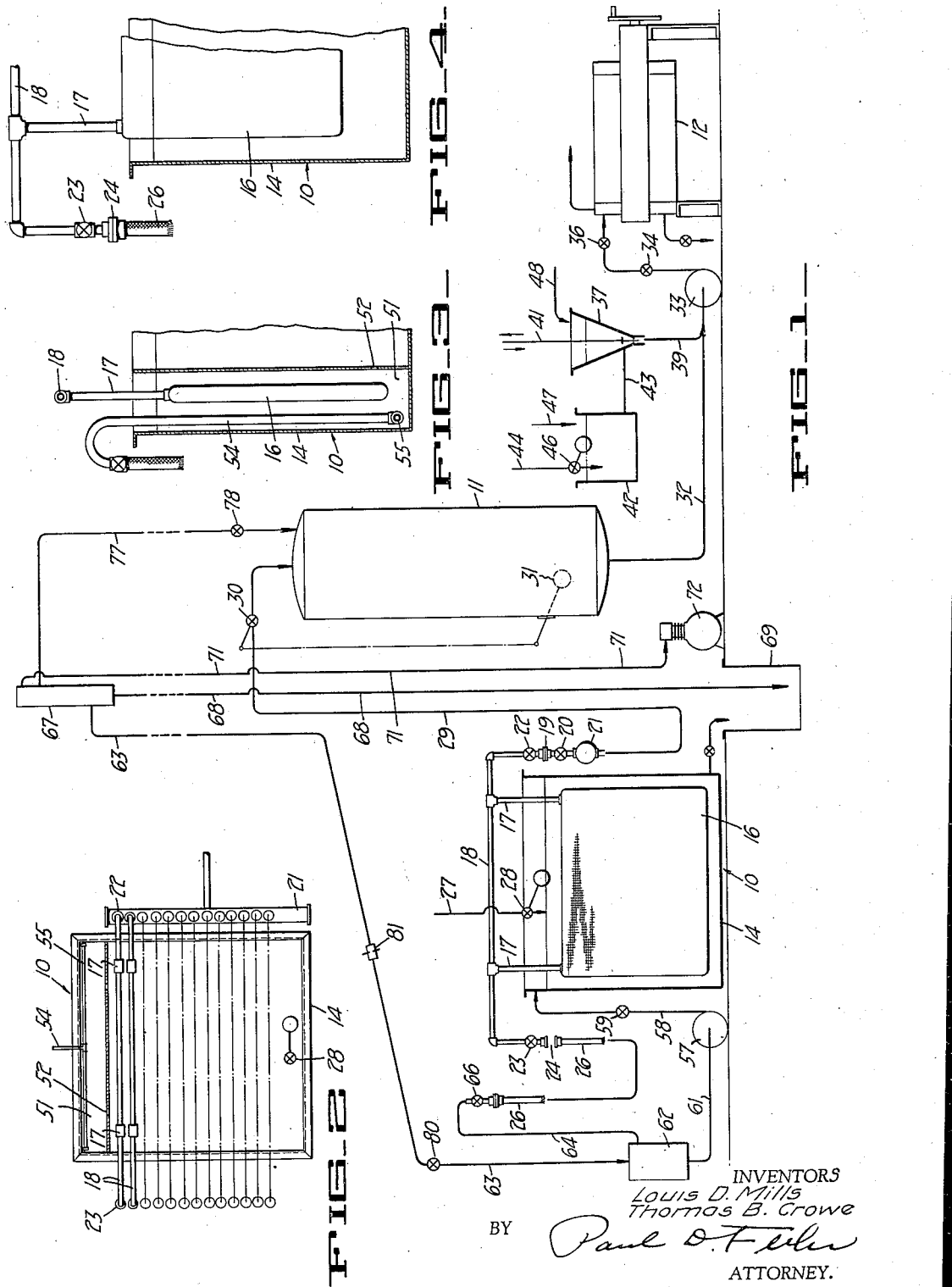
INVENTORS
Louis D. Mills
Thomas B. Crowe
BY
Paul O. Feher
ATTORNEY.

Patented Feb. 25, 1941

2,232,716

UNITED STATES PATENT OFFICE 2,232,716

CYANIDATION METHOD AND APPARATUS

Louis D. Mills and Thomas B. Crowe, Palo Alto, Calif., assignors to The Merrill Company, San Francisco, Calif., a corporation of California Application July 12, 1937, Serial No. 153,214

13 Claims. (Cl. 210—153)

This invention relates generally to methods and apparatus for the treatment of alkaline cyanide solutions containing dissolved precious metal values. More specifically it relates to methods and apparatus of the type wherein a filter is utilized for the purpose of clarifying the solution immediately prior to deaeration and precipitation thereof.

It is an object of the invention to provide a method and apparatus of the above character which will make possible individual conditioning of the elements of a clarifying filter with filter aids such as kieselguhr without interrupting continued operation of the remaining elements, and with full assurance that filter leaves are properly conditioned and are operating at optimum efficiency, before being returned to the filtering cycle. It is characteristic of the present invention that while a filter leaf, after being conditioned, is being physically transferred back to normal operating position in the filter tank, it is continuously subjected to application of suction or negative pressure, and such application of suction is continued until communication with the filtrate line is reestablished.

Another object of the invention is to provide a novel arrangement for securing application of continued suction to a filter leaf being conditioned, the arrangement making use of a minimum amount of additional equipment other than is usually required in the operation of a conventional cyanidation system.

Further objects of the invention will appear from the following description in which the preferred embodiment of the invention has been set forth in detail in conjunction with the accompanying drawing.

Referring to the drawing:

Fig. 1 is a diagrammatic flow sheet, illustrating one form of apparatus incorporating the present invention.

Fig. 2 is a plan view illustrating the arrangement of leaves in the clarifying filter, and the additional compartment employed for reconditioning.

Fig. 3 is a cross-sectional detail illustrating a filter leaf disposed within the additional compartment of the filter tank, for a reconditioning operation.

Fig. 4 is a cross-sectional detail illustrating one point in the carrying out of the present method, namely lowering of an individual filter leaf back into the main tank of the clarifying filter, after a conditioning operation.

The apparatus illustrated in Fig. 1 of the drawing includes generally a solution clarifying filter 10, a deaerating receiver 11, and a precipitating filter 12. As is known by those skilled in the art, settled but unclarified cyanide solution having dissolved precious metal values, is supplied to the tank of the clarifying filter 10, and after being clarified the effluent flows to the deaerating receiver 11, where dissolved air is removed. The solution then flows from the deaerating receiver to the precipitating filter 12, and in transit zinc dust or zinc dust emulsion is added to effect precipitation.

The clarifying filter 10 is of the vacuum leaf type, and consists of a solution tank 14, in which a plurality of filter leaves 16 are disposed. In conventional practice such filter leaves are connected by a riser pipe to an effluent manifold, through a coupling to facilitate detachment. In the present instance we provide a detachable pipe connection between each filter leaf and the effluent manifold, but the connection makes use of an additional valve or stop cock. Furthermore the pipe for each filter leaf is provided with a supplemental coupling and valve or stop cock, whereby an external connection can be made from a source of suction to the filter leaf, independent of the connection to the effluent manifold.

Connections of the type described above have been illustrated in Fig. 1 of the drawing. Thus each filter leaf 16 is shown provided with a pair of riser pipes 17, and these pipes connect with a horizontal pipe 18. One end of the pipe 18 is provided with a coupling 19, for making detachable connection with the effluent manifold 21, and a valve or stop cock 22. Between coupling 19 and manifold 21, there is the usual valve 20. The other end of the pipe 18 is provided with a valve 23, and coupling means 24. As will be presently explained coupling means 24 makes possible attachment of the pipe 18 to an auxiliary flexible hose 26.

Solution is introduced into the main compartment of tank 14, by the solution line 27, which can be controlled by a float valve 28. The effluent manifold 21 is shown being connected by flow line 29, to the upper portion of the deaerating receiver 11. Flow line 29 is shown being controlled by valve 30, which in turn is controlled by a float 31 within the deaerating receiver 11. The lower end of deaerating receiver 11 is connected by a pipe line 32, with the inflow side of a liquid sealed solution pump 33. The discharge side of this pump connects to the precipitation filter 12, which can be of a type depending upon the equipment available. The precipitating filter illustrated is of the filter press type, which requires for its proper operation that the solution be supplied at considerable pressure. The flow line connecting pump 33 with the press 12, is shown provided with a check valve 34, to prevent back flow of solution. Also a common valve 36 is shown interposed in flow line 32.

For introducing zinc dust into the cyanide solution, after deaeration, we have shown a so-called zinc emulsion cone 37, which has its lower end connected by pipe 39 to flow line 32. Admission of emulsion from cone 37 to pipe 39 is controlled by a reciprocable valve, which in turn is actuated by a periodically operated rod 41. Solution is maintained in emulsion cone 37 at a fixed level, by means of a steady head tank 42, which is connected to cone 37 by pipe 43. Barren solution is supplied to steady head tank 42 through flow line 44, which is controlled by a float valve 46. As indicated by the line 47, a reagent like lead acetate, can be supplied to the barren solution in steady head tank 42. Line 48 represents introduction of measured quantities of zinc dust into the cone 37, where the zinc dust is mixed with barren solution. The resulting zinc emulsion is admitted through pipe 39 to intermix with the solution flowing to the precipitating filter 12.

Returning now to features of the clarifying filter, a supplemental compartment or tank is provided in which individual filter leaves can be conditioned, prior to introducing them into the main filter tank for reuse. This supplemental tank can conveniently be in the form of an end compartment 51, formed by partitioning off a portion of the main filter tank. The lower portion of the partition can be provided with openings 52 (Fig. 3) whereby a solution level will be maintained in the auxiliary compartment 51, the same as in the main portion of the tank. The filter aid generally employed to condition a filter leaf is kieselguhr or some material having comparable clarifying characteristics. As will be presently explained the kieselguhr is added to the liquid in compartment 51, either directly as a dry powder to be mixed with the solution, or as a pre-mixed slurry. In order to keep the kieselguhr in suspension in compartment 51, some suitable form of agitating means is employed, such as a pipe 54, which is connected to a source of air under pressure, and which extends down into the compartment 51, and has its lower end connected to a jetting nozzle 55.

To effect a conditioning operation suction is applied to the interior of a filter leaf while the same is immersed in a suspension of kieselguhr in the auxiliary compartment 51. If such application of suction were interrupted, then the filter leaf, without any suction being applied, transferred to the main tank of the filter and reconnected with the effluent manifold, there would be an opportunity for the precoat of kieselguhr to become dislodged, with the result that it would not be as effective as desired to produce a sparkling clear filtrate. Furthermore one would not be certain of the clarity of the filtrate, before permitting it to flow to the deaerating receiver.

In carrying out the present invention, we make suitable attachment to the coupling 24 of a filter, after the filter leaf has been removed from the filter tank and the accumulated filter cake washed away. This connection serves to apply suction to the filter leaf during a conditioning operation, while it is in the compartment 51.

After this conditioning operation and as the filter leaf is being lifted from the compartment 51, the suction means serves to withdraw liquid from the interior of the leaf and to simultaneously apply a partial vacuum or pneumatic suction. This pneumatic suction is sufficient to retain the coat of kieselguhr intact upon the filter cloth, while the filter leaf is being handled to transfer it back to the main tank of the filter. As the filter is being re-introduced into the main compartment of the filter, application of pneumatic suction is continued, and filtrate as it passes through the filter cloth is also withdrawn by suction. After the filter leaf has been submerged and restored to its normal operating position, it has become scavenged of any trapped air, and the auxiliary suction means previously referred to now withdraws filtrate from the filter leaf. The operator then reconnects the coupling 19, and when it appears on visual inspection that the filtrate being withdrawn from the filter leaf is sparkling clear, valves 22 and 20 are opened to permit the filtrate to pass into the manifold 21, and valve 23 is closed.

Various expedients can be utilized for connection to the coupling 24, and which will enable continuous withdrawal of liquid and application of pneumatic suction, in the manner described above. It will be evident that the suction means must be capable of handling both withdrawn liquid or filtrate, and at the same time or in the absence of filtrate, apply pneumatic suction. In the present instance we make use of a separate liquid pump, and the evacuating means for the deaerating receiver 11 is utilized as a source of pneumatic vacuum. Thus a pump 57 is provided, which can be of the ordinary centrifugal type, and which has its discharge side connected to one side of the filter tank 14 through flow line 58 and check valve 59. The discharge end of line 58 is arranged so that as the liquid returns into the upper part of the filter tank it is clearly visible, thus affording visual means for determining the degree of efficiency with which a filter leaf is functioning. The check valve 59 prevents back suction of solution or air through the pump. The inflow side of the pump is connected by pipe 61 to an air separator 62, and this separator has one pipe line connection 63 to a source of partial vacuum, and another pipe line connection 64. Line 64 connects to the flexible hose 26, through the valve 66. It will be evident that if a proper pneumatic suction is maintained within the separator 62, through pipe 63, a pneumatic suction will be applied to pipe 64 and hose 26, and then liquid withdrawn from a filter leaf through hose 26 will be delivered into the separator 62, and supplied to the inlet side of the pump 57.

As previously mentioned the source of pneumatic suction utilized makes use of evacuating equipment available upon systems of this character, in place of utilizing a separate source of vacuum. Thus the pipe 63 in this instance extends upwardly to an elevated closed receiver 67. Pipe line 68 connects the lower end of this receiver to a sump 69. Pipe line 71 connects between the upper portion of receiver 67, and the evacuating pump 72. Pipe line 77 has its upper end connected to receiver 67, and its lower end connected to the deaerating receiver 11. This pipe line is provided with a check 78, to prevent release of vacuum in the deaerating receiver 11, in the event of a substantial drop in vacuum in the receiver 67. Receiver 67 is located above barometric level, and therefore pipe 68 constitutes a barometric seal, through which liquid can drain. Under certain operating conditions there is a likelihood that liquid may be discharged into receiver 67 from pipe line 63. Note that the connections of pipes 71 and 77 with receiver 67 are elevated, so that any liquid discharged into the receiver 67 from pipe 63 will drain downwardly through pipe 68, and will not in any event be withdrawn into pipes 71 or 77. Pipe 63 can be provided with a valve 80.

In the arrangement described above it is desirable to provide some form of flow control means in order to avoid too rapid a fall in vacuum in receiver 67, corresponding for example to a condition in which a filter being treated is exposed to the air and is therefore permitting atmospheric air to be drawn through the filter cloth through hose 26, pipe 64 and receiver 62. To secure such control a flow restricting orifice 81 is inserted in the pipe line 63. This orifice is suitably proportioned in accordance with the requirements, so that when the evacuating pump 72 is operating the flow resistance through orifice 81 will be such that a fair partial vacuum can be maintained in the receiver 67.

Operation of the apparatus described, and the carrying out of the present method, can now be reviewed as follows: When it is desired to recondition an individual filter leaf, the operator closes valve 20 on the pipe 18 of that filter leaf, and disconnects the coupling 19. The disconnected filter leaf is then removed from the filter tank, and accumulated filter cake is removed as by flushing with water. The same filter leaf is then placed in the compartment 51, its coupling 24 connected to the hose 26 as shown in Fig. 4, valve 23 is opened, and valve 22 closed. Pump 57 is now started in operation, and the operator makes certain that valves 66 and 23 are open. Kieselguhr is added to the liquid in compartment 51, and the kieselguhr maintained in suspension by air introduced through pipe 54. Liquid is now withdrawn by suction from the filter leaf, and this liquid passes through hose 26, separator 62, through the pump 57, and from thence through pipe 58 back to the filter tank. After a certain period of time the filter cloth of the filter leaf will have become effectively and evenly coated with kieselguhr, and the filter leaf will now be in condition for retransfer back to the main compartment of the filter tank. The apparatus, including the pump 57, is now permitted to operate the same as during the coating operation, and the operator lifts the filter leaf from the auxiliary compartment. While the filter leaf is being so lifted any remaining filtrate is sucked out through hose 26 and delivered to the pump 57. It will also be evident that as the filter leaf is being lifted clear of the liquid some air is sucked through the exposed filter cloth, and enters the pipes 16 through one or more small vents which may be provided for this purpose in the upper part of the filter leaf. Air thus sucked through the filter cloth likewise passes through the hose 26, separates from liquid in separator 62, and passes through pipe 63 to the receiver 67.

An appreciable drop in the vacuum maintained in receiver 67, which may well occur when a considerable amount of air has entered hose 26, will not affect the maintenance of vacuum in the deaerating receiver 11, because of automatic closing of the check valve 78. In this connection it may be noted that receiver 11 can continue to function efficiently for a considerable period of time, without appreciable loss of vacuum, even though it is not continuously connected to evacuating means. When the filter leaf has been completely withdrawn from the auxiliary compartment, it has been substantially scavenged of liquid, and it is now subjected to continuous application of pneumatic suction, which serves to hold the wet coating of kieselguhr intact. As the filter leaf is being re-introduced into the main compartment of the filter tank, some liquid and air is withdrawn as the leaf is being lowered to final position, and as the leaf is restored to its original position, flow of filtrate is established. The operator now reconnects the coupling 19 to the manifold 21, but does not open both the valves 20 and 22, until he is assured by observing the discharge from pump 57, that the filtrate is sparkling clear. When he is thus assured that the filter leaf is functioning in its most efficient manner, valves 20 and 22 are opened, and thereafter valve 23 is closed. Since valves 20 and 22 are opened before valve 23 is closed, the negative pressure within the filter leaf is continuous and the pre-coating layer on the surface of the filter fabric is not disturbed. Hose 26 can now be disconnected for application to another filter leaf.

The separator 62 can be a simple chamber having connections as described, or it can be provided with an inner float, which operates a valve for controlling communication with pipe 61. With such a separator pipe 61 is automatically closed during periods when no liquid is received through the pipe 64, the same as with a conventional steam trap. A separator of this kind precludes discharge of liquid through pipe 63 into receiver 67, which as previously explained, may at times occur when separator 62 is a simple chamber.

We claim:

1. In apparatus of the character described for the clarification of cyanide solution, a filter tank having two compartments interconnected below the normal solution level, a vacuum effluent manifold, a plurality of filter elements in one compartment and detachably connected to said manifold, and means for continuously maintaining a negative pressure within any one filter element while transferring the same from one compartment to the other.

2. In apparatus of the character described for the clarification of cyanide solution, a solution tank containing vacuum filter leaves, means for establishing detachable connection between said leaves and a common effluent line, and means independent of said effluent line for applying continuous suction to an individual leaf after detachment of the same with respect to said effluent line, said last means being operable during removal and introduction of an individual filter leaf into said tank and while said leaf is exterior of the tank.

3. In apparatus of the character described for the clarification of cyanide solution, a solution tank, a plurality of vacuum filter leaves disposed within the tank and adapted to be immersed in solution being clarified, a common effluent line, means for establishing detachable connections between said effluent line and each of said filter leaves, whereby any one filter leaf can be disconnected with respect to the effluent line and removed from the solution tank, pumping means forming a source of suction independent of said effluent line, and means for establishing detachable connection between any one filter leaf and said pumping means, whereby said pumping means can be continuously applied to a filter leaf while disconnected with respect to the effluent line or while such connection is being established, and a pipe connected to the discharge side of the pumping means and having a point of open discharge whereby the clarity of the solution can be inspected.

4. In apparatus of the character described for the clarification of cyanide solution, a filter tank, a plurality of individual vacuum filter leaves disposed within said tank and adapted to be immersed in cyanide solution, a common effluent line, means for establishing detachable individual connection between each of said filter leaves and said common effluent line, whereby any one individual leaf can be detached with respect to the effluent line and individually removed from the tank, and means independent of said effluent line for applying both pneumatic and hydraulic suction to an individual leaf, whereby suction can be maintained upon an individual leaf while the same is exterior of said tank, while the leaf is being introduced into the tank, and when the leaf has been re-positioned in the tank and while connection between the same is being re-established to the effluent line.

5. In apparatus of the character described for the clarification of cyanide solution, a filter tank, a plurality of vacuum filter leaves disposed within the tank and adapted to be immersed in cyanide solution, a common effluent line, means for establishing detachable connection between each of said filter leaves and said common effluent line, whereby any one individual leaf can be disconnected with respect to the effluent line and individually removed from the tank, a liquid pump independent of the effluent line, means for establishing detachable connection between the suction side of said pump and any one individual leaf, whereby an individual leaf can be precoated while disconnected with respect to the effluent line.

6. In apparatus for the clarification of cyanide solution, a filter tank, a plurality of vacuum filter leaves disposed within the tank, an effluent line, means for establishing detachable connection between each of said filter leaves and said effluent line, whereby any one individual leaf can be disconnected with respect to the effluent line and individually removed from the tank, a liquid pump independent with respect to the effluent line, means for establishing detachable connection between the suction side of said pump and any one of said individual leaves, and means for simultaneously establishing connection between the same leaf and a source of partial vacuum.

7. In apparatus for the filtration of cyanide solution, a filter tank, a plurality of vacuum filter leaves disposed within the tank and adapted to be immersed in cyanide solution, a common effluent line, means for establishing individual detachable communication between each of said filter leaves and said effluent line, whereby any one individual leaf can be detached with respect to the effluent line and individually removed from the tank, a liquid pump independent of the effluent line, means for establishing detachable communication between any one individual leaf and the suction side of said pump, whereby said pump serves to apply hydraulic suction to a filter leaf before or after detachment of the filter leaf with respect to the effluent line, air separating means interposed in connection from the inlet side of the pump and an individual filter leaf, and means for applying a partial vacuum to said air separating means, whereby either pneumatic or hydraulic suction, or both, can be applied to an individual filter leaf.

8. In apparatus for the filtration of cyanide solution, a filter tank, a plurality of individual vacuum filter leaves disposed within the tank, a common effluent line for the filter leaves, means for establishing detachable connection between each of said filter leaves and said effluent line, whereby an individual filter leaf can be detached and removed from the tank without interrupting continued operation of remaining filter leaves, a deaerating receiver connected to the effluent line, a vacuum pump connected to the deaerating receiver, said connection including a pipe extending above barometric level to afford a barometric seal, a liquid pump independent of the effluent line, means forming a flow connection whereby the inflow side of the pump can be detachably connected with any one filter leaf, independently of the connection to the effluent line, a pipe connection between said flow line and communication with said vacuum pump, said last pipe line including a portion extending to a height sufficient to form a barometric seal, and a check valve interposed in the connection between the deaerating receiver and the vacuum pump, whereby partial vacuum applied by the pump to said gas separator may be less than the vacuum existing within the deaerating receiver.

9. A method of treating cyanide solution containing precious metal values, involving the use of a clarifying filter of the vacuum type having a plurality of filter leaves connected to a common effluent line and disposed within a filter tank, together with a deaerating receiver connected to the effluent line, the method comprising placing a leaf, while disconnected with respect to the effluent line, in a separate precoat compartment or container where the leaf is immersed in a suspension of cyanide solution and a granular filter aid, applying negative pressure to the leaf while in the precoat compartment to draw solution from the leaf and to coat the leaf with the filter aid, transposing the precoated leaf into the filter tank while maintaining negative pressure within the same to avoid disturbance of the precoat, visually inspecting the effluent withdrawn from the leaf after introduction of the same in the filter tank to insure sparkling clarity, and then connecting the precoated leaf to the main effluent line.

10. A method of treating cyanide solution containing precious metal values, involving the use of a clarifying filter of the vacuum type having a plurality of filter leaves connected to a common effluent line and disposed within a filter tank, together with a deaerating receiver connected to the effluent line, the method comprising disconnecting a leaf with respect to the effluent line, taking the leaf from the filter tank and washing away accumulated filter cake from the same, placing the leaf in a separated precoat compartment or container where the leaf is immersed in a suspension of cyanide solution and a granular filter aid, applying negative pressure to the leaf while in the precoat compartment to draw solution from the leaf and to coat the leaf with the filter aid, transposing the precoated leaf into the filter tank while maintaining negative pressure within the same to avoid disturbance of the precoat, and then reconnecting the precoated leaf to the main effluent line when the filtrate has attained suitable clarity.

11. In apparatus of the character described, for the treatment and precipitation of cyanide solution containing dissolved precious metal values, a clarifying filter comprising a solution tank and a plurality of separate filter leaves disposed within said tank, a deaerating receiver, a solution pump having a discharge line leading back to the tank of the clarifying filter, and means for optionally connecting the individual leaves of the clarifying filter to either the deaerating reciver or the inlet side of the pump.

12. In a method of the character described for clarifying cyanide solution containing dissolved precious metal values, preparatory to precipitation of the solution, and wherein the solution is clarified by the use of a vacuum leaf filter having a plurality of filter leaves normally connected to a common effluent line and requiring conditioning with a filter aid after filter cake has been removed from the same; the steps of contacting the outer surface of an individual filter leaf with a suspension of the filter aid while the individual leaf is disconnected with respect to the common effluent line and while suction is being applied to the interior of the leaf, whereby the exterior surface of the leaf is coated with the filter aid, introducing the individual filter leaf so conditioned into the tank of the clarifying filter whereby the leaf is re-submerged in the solution contained in the filter tank, applying suction to the interior of the filter leaf while it is being re-submerged in the solution of the filter tank, and then re-establishing normal communication between the filter leaf and the common effluent line.

13. In a method of clarifying cyanide solution utilizing a plurality of vacuum filter leaves disposed in a filter tank and normally having communication with a deaerating receiver, the steps of circulating solution through an individual leaf while communication between the same and the effluent line is interrupted, inspecting the effluent withdrawn from the leaf and continuing such circulation until the effluent attains suitable clarity, and then re-establishing communication between said element and said effluent line.

LOUIS D. MILLS.
THOMAS B. CROWE.